Figure 1:
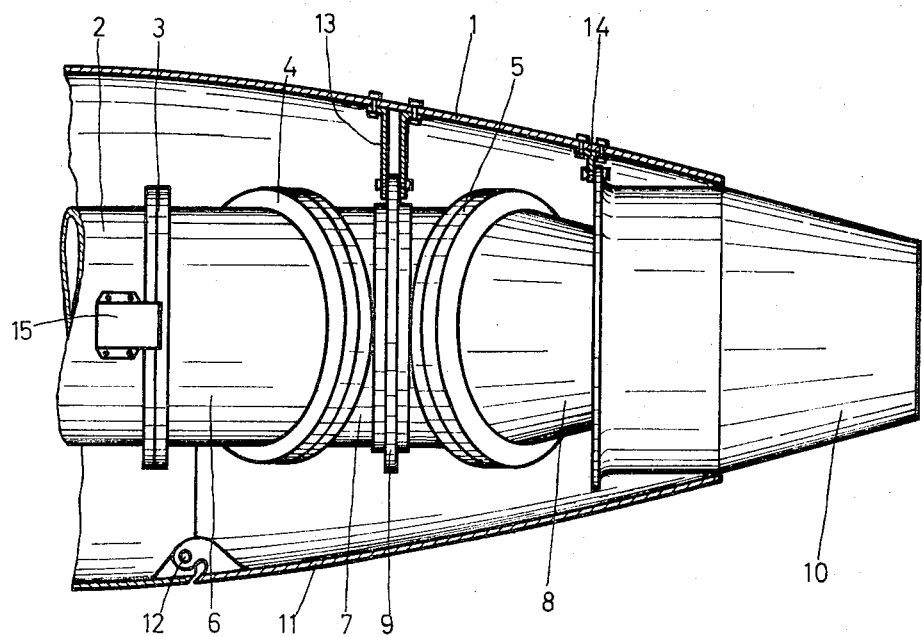

United States Patent
Kopp

[11] 3,829,021
[45] Aug. 13, 1974

[54] JET DEFLECTOR FOR V/STOL-AIRCRAFT
[75] Inventor: Gerhard Kopp, Munich, Germany
[73] Assignee: Messerschmitt-Bolkow-Blohm GmbH, Munich, Germany
[22] Filed: Mar. 12, 1973
[21] Appl. No.: 340,227

[30] Foreign Application Priority Data
Mar. 16, 1972 Germany.............................. 2212649

[52] U.S. Cl.................. 239/265.35, 60/232, 244/56
[51] Int. Cl. ............................................ B64c 15/04
[58] Field of Search.................. 239/265.11, 265.35; 60/228, 232; 244/56, 23 D

[56] References Cited
UNITED STATES PATENTS
| | | | |
|---|---|---|---|
| 2,590,272 | 3/1952 | Robertson et al. | 239/265.35 UX |
| 3,003,312 | 10/1961 | Jewell | 239/265.35 |
| 3,230,708 | 1/1966 | Huang et al. | 239/265.35 X |

Primary Examiner—M. Henson Wood, Jr.
Assistant Examiner—Michael Y. Mar
Attorney, Agent, or Firm—Woodhams, Blanchard and Flynn

[57] ABSTRACT

Improvement in construction for a jet deflector for V/STOL-aircraft. In such aircraft having a curved exhaust gas duct which is rotatable for controlling the magnitude and direction of jet deflection, and wherein there is provided bearings between relatively rotatable portions of said ducts, there is provided locking means by which said duct is locked to and supported by the frame of the aircraft under certain desired conditions. Thus, when the aircraft is in normal cruising flight, the otherwise rotatable duct may be rigidly locked to the frame of the aircraft and thereby be supported on and by said frame to relieve said bearings from a substantial portion of the load otherwise imposed thereon. This minimizes wear on said bearings and contributes to a longer life for same. The locking and unlocking device may be either under the direct control of the pilot or may be automatically responsive to the position of the jet deflector mechanism.

10 Claims, 2 Drawing Figures

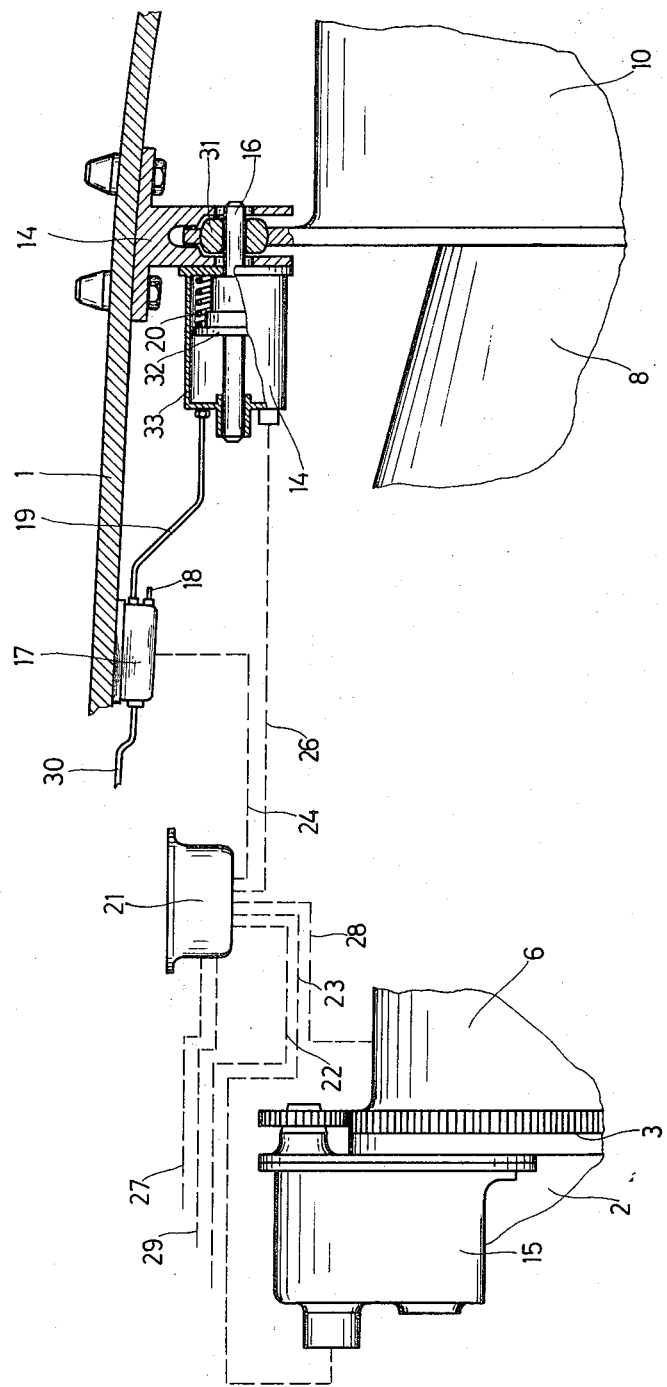

JET DEFLECTOR FOR V/STOL-AIRCRAFT

The invention relates to a jet deflector for V/STOL-aircrafts having tube sections which can be rotated relative to one another.

In general in jet engines with a curved exhaust gas duct and a deflection device for the gases, the structural parts which effect the jet deflection are supported on the engine housing which latter thus must absorb the entire loads resulting from the gas deflection. This requires a heavy and rigid housing construction.

To avoid these disadvantages it has already been suggested that a bearing device which is secured on the curved exhaust gas duct engage a fixed structural part of the airframe so that the loads resulting from the gas deflection are transferred by the said bearing device onto such fixed structural part. This advantageously lightens the construction of the engine housing.

However, this type of fastening is not possible in jet deflectors for V/STOL-aircrafts with tube sections which can be rotated relative to one another because of the different positions assumed by the tube sections relative to the airframe. Further, in such jet deflectors, the loads resulting from the gas deflection are imposed onto the antifriction bearings which are provided between the individual tube sections and contribute to their premature wear.

Therefore, the basic purpose of the invention is to minimize the loads which are caused in jet deflectors of the above-mentioned type by the gas deflection from the engine housing and thus to minimize the load on the antifriction bearings, whereby to increase the life of the antifriction bearings and of the jet deflector.

This purpose is attained by constructing the jet deflector for either complete or partial locking, as desired, with the fuselage structure when said jet deflector is in the normal cruising position. This locking can according to the invention be accomplished in two ways. The first type of locking refers to the locking of the thrust nozzle with the fuselage structure. In this the thrust nozzle which is mounted on the end of the jet deflector is connected to the fuselage structure of the aircraft directly through a locking mechanism.

The second type of locking involves one or more tube sections being lockable with the fuselage structure. According to the invention the central tube section is advantageously connected to the fuselage structure through a lock mounted on reinforcing structure or other means.

Since the jet deflector locked only during the principal operating period, namely during the cruising flight, the invention provides in one form that the locking mechanisms can be locked and unlocked by the pilot.

However, in order to relieve the pilot as much as possible, the invention provides further that the locking and unlocking can be operated automatically with the control of the deflector.

The invention is further described with reference to the drawing (FIG. 1).

The fuselage of the aircraft is indicated by the reference numeral 1. The engine is identified generally at 2, the first bearing at 3, the second bearing at 4 and the third bearing at 5. The three tube sections which comprise the jet deflector are indicated at 6, 7 and 8, respectively. The numeral 9 illustrates a reinforcing member on the central tube section 7; 10 is the thrust nozzle which is secured on the rear-most tube section 8. The numeral 11 indicates a fuselage flap which is pivotable about the point 12 and which opens the fuselage on the underside of the aircraft to permit the swinging movement of the jet deflector. All of the foregoing is conventional and hence needs no further detailing. The numeral 13 is the lock of the central tube section with the fuselage structure 1 and 14 is the lock of the thrust nozzle 10 with the fuselage structure 1. Both of these locks may be of any convenient and conventional type with suitable pilot operated or automatic controls (not shown). The numeral 15 indicates the drive motor for the adjustment of the rear tube section 6, the adjustment mechanism of which is conventional and hence not illustrated. When the aircraft is in the cruising flight prior to the transition to the landing operation, the pilot releases the lock 13 of the tube sections or the lock 14 of the thrust nozzle. This cleans the mechanism for the operation for the drive of the jet deflector.

After releasing the locks, the pilot turns on, for operating the jet deflector, the drive motor 15 for adjusting the rear tube section 6. By rotating the tube section 6 relative to the engine 2 in a manner already known, a planetary gear system (not illustrated) on the tube section 6 is activated in such a manner as to rotate also the tube section 7. In the same manner the tube section 8, and thus also the thrust nozzle 10, are rotated as already known by a planetary gear system (not illustrated) on the tube section 7. In reverse, after reaching the cruising flight, the pilot locks the tube sections or the thrust nozzle or same is accomplished automatically and thereby reduces the wear on the antifriction bearings between the tube sections. A further drawing (FIG. 2) illustrates the way in which the lock mechanism is operated and the lock itself is controlled.

The items provided with the reference numerals 1, 2, 3, 6, 8, 10, 14 and 15 correspond to those on FIG. 1 shown under the same designation. Furthermore, FIG. 2 (right half) shows a bolt subjected to shear forces at 16 which forms part of the lock 14 and which via a pivot-joint bearing 31, in which said bolt can be inserted, is capable of making the desired connection between the fuselage structure 1 and the thrust nozzle 10, for example. The latter is accomplished via a pneumatic control unit 17 which is capable of applying pressure to a piston 32, secured to the bolt 16 in the cylinder 33 of the lock 14, via an air pressure duct 19 in such a way that the bolt 16 according to FIG. 2 is inserted to the right into the bearing 31. To initiate the reverse operation, provision is made for an exhaust air duct 18 which in the opened condition permits a compression spring 20 acting on the piston to remove the air from the cylinder 33, moving the bolt 16 back again to the left in its initial position and, thus, unlocking the whole device.

The numeral 21 indicates a further control unit used to control the movement sequence between the rotatable and/or moving tube sections, the pivotable fuselage flap, the thrust nozzle and the lock. All these elements may only be actuated when they are suitably interrelated and/or suitably synchronized. For example, a tube section may only be moved when the lock is released and the pivotable fuselage flap opened. In order to ensure this and similar operations, provision is made for the electronical synchronization control unit 21. The reference numeral 22 indicates a connecting line leading from the electronical synchronization control unit 21 to the cockpit (not shown). A connecting line between the drive motor 15 and the electronical synchronization control unit 21 is identified at 23. Finally, 24 is a connecting line between the electronical synchronization control unit 21 and the pneumatic control unit 17. The respective position-dependent pressure of the lock 14 is transmitted to the electronical synchronization control unit 21 via the line 26; this system in itself is known as a so-called feedback system. The line 27 is used to connect the drive (not shown) of the pivotable fuselage flap 11 (FIG. 1) with the electronical synchronization control unit 21. 28 is the line for position-dependent pressure transmission between a rotatable tube section and the control unit 21, whereas provision is made for a line 29, transmitting the position-dependent pressure, between said control unit and the pivotable fuselage flap 11.

The pneumatic control unit 17 is connected via a line 30 to an appropriate pressure generator, e.g. a compressor, which is likewise not shown.

The lock 14 is so designed that in the event of a failure of air pressure actuation the locked parts are automatically unlocked by means of the compression spring 20; this is of utmost significance for the functional safety of the relevant aircraft. The design of the lock 13 for the central tube section may correspond to that of the lock 14.

The embodiments of the invention in which an exclusive property or privilege is claimed are defined as follows:

1. Jet deflector for V/STOL-aircraft comprising several tube sections which can be rotated relative to one another for controlling jet deflection, means for changing the direction of jet deflection by relatively rotating at least a pair of said tube sections, and means for totally or partially locking said jet deflector with the aircraft fuselage structure, in the preferred cruising position of the jet deflector.

2. A jet deflector according to claim 1 in which three said tube sections are provided in sequence and further including a thrust nozzle mounted at the end of said jet deflector, said locking means including a first locking mechanism actuable for fixing at least one of said tube sections to said fuselage and against rotation with respect to the remaining tube sections and furthing including a second locking mechanism actuable for fixing said thrust nozzle to said fuselage and against rotation with respect thereto, whereby to reduce wear on rotational bearing interfaces between adjacent ones of said tube sections and nozzle.

3. Jet deflector according to claim 1 in which said locking means comprises an axially shiftable bolt member, said fuselage and deflector including overlapping normally relatively rotatable portions and means defining holes through said overlapping portions alignable in the cruising position of said jet deflector for receiving said bolt member therein, for said locking of said jet deflector with respect to said fuselage structure.

4. Jet deflector according to claim 3 in which said locking means further includes a pressure fluid cylinder having a piston for axially driving said bolt member, means for supplying pressurized fluid thereto and control means for controlling said supplying means.

5. Jet deflector according to claim 4 including spring means responsive to discontinuation of pressure fluid flow to said cylinder for retracting said bolt member out of locking interengagement with said jet deflector and fuselage.

6. Jet deflector according to claim 4 in which said control means includes feedback inputs of position dependent pressures, including one said input from said pressure fluid cylinder and for purposes of coordinating unlocking of said jet deflector from preferred cruise position with other functions of the aircraft in shifting from cruise condition, said control means having plural outputs including one said output controlling said pressure fluid source for effecting unlocking of said jet deflector.

7. Jet deflector according to claim 1, including a thrust nozzle mounted on the end of the jet deflector and said locking means includes a locking structure connecting said thrust nozzle directly to the fuselage structure of the aircraft.

8. Jet deflector according to claim 1, wherein said means for locking includes a locking mechanism for interconnecting said jet deflector and fuselage structure and means for enabling said locking mechanism to be locked and unlocked by the pilot of the aircraft.

9. Jet deflector according to claim 1, wherein said means for locking includes a locking mechanism for interconnecting said jet deflector and fuselage structure and means for locking and unlocking said locking mechanism automatically with the control of the deflector.

10. Jet deflector for V/STOL-aircraft comprising several tube sections which can be rotated relative to one another, said tube sections including a central tube section, the jet deflector being constructed in the preferred cruising position for total or partial lockability with the fuselage structure of the aircraft, the central tube section being connected to the fuselage structure through a lock mounted on a reinforcing member.

* * * * *